Oct. 19, 1937.　　　R. T. HOSKING　　　2,096,040

LOCK NUT

Filed Feb. 11, 1935

INVENTOR
R. T. HOSKING
BY
George B. Willcox
ATTORNEY

Patented Oct. 19, 1937

2,096,040

UNITED STATES PATENT OFFICE 2,096,040

LOCK NUT

Richard T. Hosking, Wilmette, Ill.

Application February 11, 1935, Serial No. 5,886

7 Claims. (Cl. 151—37)

This invention relates to improvements in locking devices for nuts, set screws or the like which are termed rotatable screw-threaded members, characterized by having on the face of the nut a series of ridge elements that operate while the nut is being screwed down tight to build up rib-like barriers on the face of the work piece. The function of the barriers thus created on the work piece is to co-operate with the ridges on the nut to prevent the nut from loosening in use.

My improvement pertains more particularly to the ridge elements, their novel arrangement, configuration and mode of operation.

Correct appreciation of the objects and unique advantages of my improvement over known devices of such character requires a brief statement of some of the working conditions under which a lock-nut of this kind may be required to function.

Nuts which are standard in automotive practice have walls so thin that undue pulling stress brought on the bolt in use tends to imbed the face of the nut into the work, soon resulting in loose connections and squeaks.

Under such circumstances the greatest possible amount of effective bearing area for the face of the nut should be presented by the rib-like barriers that are generated on the work face by the rotation of the nut. The barriers should be arranged and shaped so that they can not be crushed, flattened or undesirably distorted by any pressure which the nut may exert upon them.

Prior devices usually left depressions, unfilled grooves or gouges in the face of the work after the barriers were formed, and such voids were objectionable because they reduced the bearing area for the nut.

The series of rib-like barriers or wales while being raised up on the work should maintain an intimate full-bearing contact with the ridge elements of the nut during all stages of further tightening and setting down, and for that purpose the wales themselves should be of appropriate length and height and of uniform cross-sectional shape. The initial shape of the wales when raised up should be preserved by the flow-restraining, confining, reinforcing action of the ridge elements on the nut by which they were created, and their ability to withstand great pressure should be maintained unimpaired. Earlier devices usually employed staggered cutting teeth on the face of the nut, but they were talon-like and abrupt and did not satisfy the requirements just mentioned because they did not provide any sidewise reinforcement for the rib-like members on the work piece.

In a nut-lock made according to my invention the improved wale-forming means on the nut attains all of the above mentioned desirable results, that is, it creates in the face of the work an ample serrated bearing area; it provides ample uniform support for the individual rib-like barrier elements or wales, enabling them to keep their shape under the heavy strains of the nut; and it maintains full-bearing contact between the wales and the ridge element on the nut at all stages of tightening.

Sometimes in attaching fish plates to rail joints it becomes necessary to tighten the threaded nut as much as six complete turns after the first thousand pounds pressure on the face of the nut has been reached. Likewise, in fastening a bumper on a motor car, that part of the bumper which comes in contact with the chassis is not usually quite parallel with the chassis and must be drawn up by the threaded nut until it is parallel and tight, frequently requiring several turns of the nut after it comes into locking engagement with the work piece. Abrupt teeth of the earlier kind above referred to, if given extra turns, merely cut circular grooves in the work and practically destroy the locking effect.

A lock-nut, therefore, to be satisfactory must be capable of making extra turns under heavy stress without damaging the face of the work piece or injuring the locking barriers or wales that were formed by preceding turns of the nut. That desirable result also is attained by my improvement.

With the foregoing and certain other objects in view, which will appear later in the specification, my invention comprises the devices described and claimed and the equivalents thereof.

The invention will be illustrated and described as being applied to the face of a threaded nut, and in an alternative form to the end of a threaded screw. Yet it is applicable to any other rotatable threaded body, such as a screw head, or a bolt whose end face is perpendicular to its axis of rotation. The term "nut" will be understood to designate all such alternative embodiments of the claimed invention.

In the accompanying drawing like reference characters designate like parts in the several views.

Figure 1:
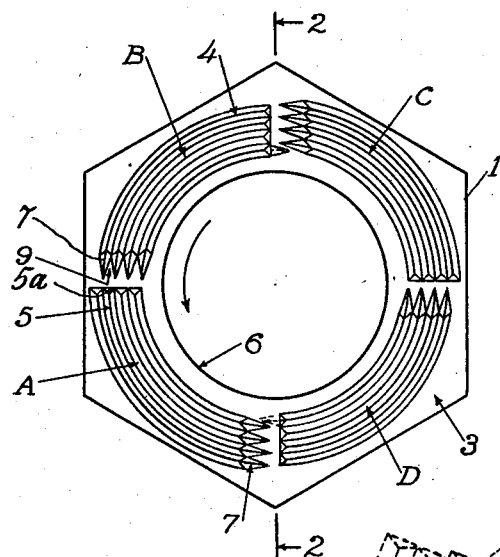
Fig. 1 is a face view of a nut embodying my invention.
Figure 2:
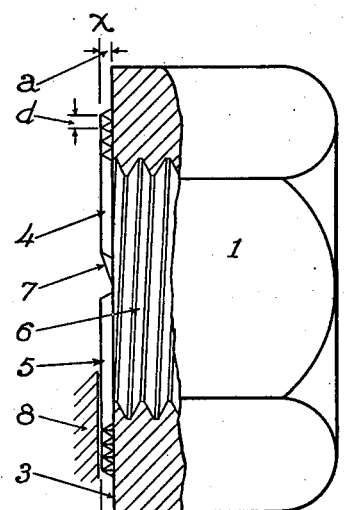
Fig. 2 is a side view, partly sectional, on the line 2—2 of Fig. 1.

Referring to Figs. 1 and 2, for a typical embodiment of my invention, a threaded rotatable body such as a nut 1, has on its flat end face 3 a number of hardened arris-shaped, elongated arcuate protuberant ridges 4, 5, arranged in four groups. Groups A and C are alike, as are groups B and D and the groups are arranged in substantially circular formation. The ridges 5 of any group, A, are in offset circumferentially staggered relation to the ridges 4 of the next adjacent trailing group B, that is, certain of said ridges conform to a larger circle than other alternate ridges, so that upon tracing around any typical circle it becomes apparent that advancing ridges 5 alternate with trailing valleys 9. The amount of such radial offset is preferably equal to one half the width of a ridge.

The mode of operation is as follows:

It will be assumed that the face of the work piece 8 is flat and perpendicular to the axis of the nut, and that the nut is threaded at 6 to be screwed onto a threaded bolt (not shown). Although the nut actually engages the work with a combined axial and rotary movement similar to that which a cook gives to a biscuit cutter, its action can be studied conveniently by observing the two movements separately, as follows: First, the nut may be imagined as being merely forced endwise in its axial direction and without rotation toward the face of the work piece 8, the resulting metal displacement produced in the nut by ridges 4, 5 on face 3 of the nut being visualized as if the work piece were made of wax or other impressionable material instead of metal.

The crests of the main body portions of arris-shaped ridges 4, 5, which are of uniform height, $a$, make contact with the work piece 8 simultaneously along plane $x$—$x$, Fig. 2. They contact throughout substantially their entire length, except the tapered points 7.

Figure 5:
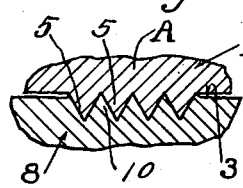
Fig. 5 is a diagrammatic detail illustrating the effective bearing surface wales produced by ridges of the kind shown in Figs. 1 and 2.

Pressing the nut further into the work face deepens the imprint or pattern of the groups A, B, C, D, and wales 10, 11 commence to rise up between ridges 4, 4 and 5, 5, Fig. 5, due to the displacement of material on the work face. Eventually the channels between adjacent ridges become filled, thus creating a serrated bearing surface for the nut composed of solid metal wales, 10. The distances $d$ between ridges are preferably uniform. No amount of added pressure on the nut can deform or destroy the bearing value thus created, because the sides of the arris-shaped ridges on the nut act as reinforcements or retaining walls for the sides and apexes of the wales 10, 11, as is apparent from inspection of Fig. 5.

It is apparent that this invention distinguishes from the earlier devices alluded to, in that ridges 4, 5 on the nut create wales 10, 11 on the work that possess adequate firm bearing areas having complete bearing contact without any voids or gouges.

Having assumed the ridges 4, 5 on the nut face 3 to have been fully embedded in the work piece by mere axial movement of the nut, it may now be assumed that the nut shall rotate in the tightening direction, without any further endwise movement, which is the second phase of movement to be considered.

Figure 6:
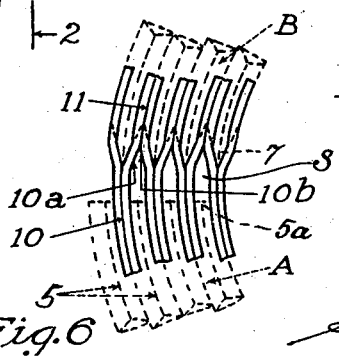
Fig. 6 is a diagrammatic fragmentary view illustrating the typical barriers and wales produced, the relative positions of the wale-forming ridges on the nut being indicated by dotted lines.

When the nut rotates, the arris-shaped ends, 7, of the ridges in group B, Fig. 6, split the wales 10 lengthwise as the wales emerge from the rear ends of the ridges of group A into the zones S and deflect the split halves laterally, but immediately recombine them into new wales 11 that are offset 10 from the wales 10. This splitting, deflecting and recombining is done while maintaining the solidity and integrity of the wales. In the short space S between the back ends 5a of the ridges 5 of group A and the arris-shaped front ends 7 of the next or trailing group B, the deflected portions 10a, 10b present smooth, solid, wall-like abutments. These abutments, 10a, 10b proceed with the nut while the nut continues to turn in the tightening direction, and they will halt all retrograde turning movements of the nut tending to loosen it in use, at any stage of the tightening operation after the wales 10 have been created.

During the above described wale-forming operations, the nut can exert very heavy stresses upon the work while it is, for example, driving a fish plate tight against a rail joint, or driving a car bumper up parallel and tight against the chassis, and it can do these things by as many additional rotations of the nut as may be necessary, without damaging the newly raised wales or impairing their effectiveness as locking elements.

The two operations, developing the wales 10, 11 and the forming of the barriers 10a, 10b, although described as separate, are in fact coincident, both being produced by screwing down the nut. It is evident that each ridge 4, 5, always keeps in tight contact throughout its length with the bottom of the groove which it is impressing into the face of the work piece 8, giving maximum supporting surface for the nut on the work.

A moderate height, $a$, for the ridges 4, 5, say equal to about half the pitch of the nut thread 6, has been found by experience to be appropriate. Such shallow ridges have the advantage of insuring that enough metal will be formed up from the work piece to fill the valleys in the nut and give the requisite bearing strength before the nut becomes ultimately tightened.

Figure 3:
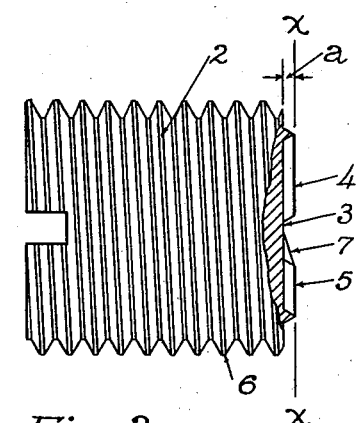
Fig. 3 is a part sectional side view of a set screw embodying a modified form of the invention, the section being on line 3—3 of Fig. 4.
Figure 4:
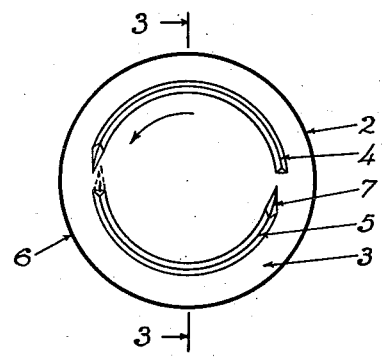
Fig. 4 is an end view of the part shown in Fig. 3.

In the alternative form of my invention illustrated in Figs. 3 and 4, a set screw with an external thread 2 is provided on its end face 3 with two concentric arc-shaped and nearly semicircular ridges 4, 5 arranged in staggered or radially offset mutual relationship to engage a flat wall presented by the end of the threaded hole in a work piece. The ridges 4, 5, their arris-like front ends 7 and their rear ends serve the same purpose as do the corresponding parts 7 and 5a in Figs. 1 and 2, although the holding power of a single pair of ridges is of course not so great as in the previously described embodiments, and less area for bearing and for locking against turning in the reverse direction is provided. The rear ends 5a may be abrupt as shown in full lines in Fig. 1, or tapered, as indicated by dotted lines in Figs. 1 and 4. In each, the rearward end of each ridge in a given circle is adjacent the advancing end of the following ridge in an adjacent circle.

Those embodiments of the invention wherein both ends of each arris are tapered or pointed have certain practical advantages, one being that the nut can be unscrewed and taken off or replaced again any number of times without destroying, tearing or seriously damaging the wales of the imprint pattern which is created in the face of the work by the arrises on the nut.

It is apparent that the arrises 4, 5, disposed in concentric circles spaced apart on the nut constitute a novel means for causing metal to rise by impressment above the surface of the work, producing wales in the form of arcs of circles that are enclosed between the arrises and compelled to retain their shape after the nut has been fully tightened; that the grooves 9 between the arrises present full bearing areas for the circular body portions of the scored or split wales 10, 11 on the work; that the arrises 4, 5, accurately fit all of the circular parts of the channels thus formed in the work, both in the nut form of Fig. 1, and in the set screw form, Fig. 4, and this is true regardless of the actual length of the arris, whether it be long enough to define a quarter or a half of the circumference, as is shown in Fig. 1 and in Fig. 4, or whether it be even shorter so that a greater number of arrises are disposed in the circle, each arris being very short and with both ends pointed.

The load on the face of the nut while being tightened is distributed equally and balanced to prevent canting, and the imprint pattern produced in the face of the work is that of arc-like wales connected together by distorted offset portions consisting of split wales, as shown in Fig. 6.

The total length of the ridges in two adjacent concentric circles is substantially equal to the length of the approximately circular figure (see Figs. 1 and 4), defined by the ridges of both circles.

From the foregoing description it is seen that my invention provides a new and useful structure and mode of operation for the ridge elements 4, 5 on the nut, whereby greatly improved locking barriers 10a, 10b are created on the face of the work piece 8. These improved barriers and the wales 10, 11 are inherently strong and effective in preventing retrograde movement and in the form shown in Figs. 1 and 2 they give a full serrated bearing area for the nut throughout the screwing down action. The concentric upstanding locking wales thus provided are firm, solid, evenly distributed and are not capable of being collapsed or flattened by excessive tightening of the nut, nor can they be obliterated by extra turns of the nut, as in earlier devices. Moreover, they will not cant the nut on its bolt or cause it to bind.

Having thus described my invention, what I claim and desire to secure by Letters Patent is:

1. A threaded rotatable member having hardened elements arranged thereon, peripherally consecutive elements of such formation having arcuate cutting edges offset radially in relation to each other by substantially half the width of a ridge, the advancing end of each ridge being tapered to an inclined cutting edge and having a lateral face, said face being spaced apart peripherally from the rear end of the preceding ridge element, defining between them a passageway adapted to receive wales created by said ridges and to deflect the same laterally in a circularly sinuous closed path during rotation of said threaded member while in engagement with a work piece, the hardened elements extending arcuately to such an extent as to give a reinforcement to the wales.

2. A threaded rotatable member having hardened ridge elements arranged thereon in substantially closed circular formation, said elements having cutting edges in a common plane perpendicular to the axis of rotation of said member, the cutting edges of successive ridge elements around said formation being mutually offset radially, and extending arcuately to such an extent as to give a reinforcement to the wales, the advancing end of each ridge element being tapered to present an inclined edge and a lateral work-engaging face, said advancing end being spaced apart endwise from the rear end of the preceding ridge, said work-engaging face constituting a wall defining a transverse passageway adapted to receive and to deflect laterally, in a circularly sinuous closed path, wales created by said ridge elements during the rotation of said threaded member in engagement with a work piece.

3. A threaded rotatable member having protuberant ridge elements arranged thereon in substantially closed circular formation, said elements having cutting edges that lie in a common plane perpendicular to the axis of rotation of said member, said cutting edges of successive ridge elements being mutually offset radially; and extending arcuately to such an extent as to give a reinforcement to the wales, the advancing end of each ridge element being tapered to present an inclined edge and a lateral work-engaging face, said advancing end and the rear end of the preceding ridge element being in overlapping relation and spaced apart endwise, presenting between them a passageway adapted to receive a wale, created by said ridge elements during rotation of said threaded member in engagement with a work piece, and to guide such wale in a closed sinuous path to positions rearward of the preceding ridge elements during such rotation.

4. A locking device including a threaded nut having ridges on its work engaging face, said ridges being arcuate, coaxial with the axis of rotation of the nut, and arris-shaped in cross section; an end portion of each ridge being beveled and presenting a metal-displacing edge, the crests of those portions of said ridges intermediate their ends together defining a common plane which is substantially perpendicular to the axis of rotation of the nut; said ridges being disposed in two concentric circles, each ridge in an outer circle being positioned alongside of a space in an inner circle and being substantially coextensive therewith.

5. A structure as set forth in claim 4 wherein the forward tapered end portion of each ridge in one circle is in overlapping relation to the rearward end portion of a ridge in an adjacent circle and spaced radially therefrom.

6. In a locking device for a threaded nut which is characterized by having on its work engaging face a pair of cooperative tapered cutting elements, one of which is arranged to form a segmental groove in the face of a work piece during the tightening movement of the nut, the other element being offset laterally and positioned in the path of a wale formed by said first element; in combination with a body portion integral with and extending rearwardly of each of said tapered elements; said body portion being of arris-like cross-sectional shape, elongated, arcuate, and defining a circle which is coaxial with the axis of rotation of the nut.

7. A structure as set forth in claim 6 wherein the cutting edges of the said arris-shaped body portions are disposed in a plane substantially perpendicular to the axis of rotation of the nut.

RICHARD T. HOSKING.